US010296562B2

(12) United States Patent
Goswami (10) Patent No.: US 10,296,562 B2
(45) Date of Patent: May 21, 2019

(54) DYNAMIC GENERATION OF MOBILE WEB EXPERIENCE

(71) Applicant: Oath Inc., New York, NY (US)

(72) Inventor: Mani Shankar Goswami, Bangalore (IN)

(73) Assignee: OATH INC., New York, NY (US)

( * ) Notice: Subject to any disclaimer, the term of this patent is extended or adjusted under 35 U.S.C. 154(b) by 540 days.

(21) Appl. No.: 13/765,553

(22) Filed: Feb. 12, 2013

(65) Prior Publication Data
US 2014/0229818 A1   Aug. 14, 2014

(51) Int. Cl.
*G06F 17/21* (2006.01)
*G06F 17/22* (2006.01)
*G06F 16/957* (2019.01)

(52) U.S. Cl.
CPC ...... *G06F 17/2247* (2013.01); *G06F 16/9577* (2019.01); *G06F 17/212* (2013.01); *G06F 17/2229* (2013.01)

(58) Field of Classification Search
CPC ..................................................... G06F 17/22
See application file for complete search history.

(56) References Cited

U.S. PATENT DOCUMENTS

| | | | |
|---|---|---|---|
| 5,999,948 A * | 12/1999 | Nelson et al. | 715/207 |
| 6,035,300 A | 3/2000 | Cason et al. | |
| 6,738,077 B1 | 5/2004 | Wendker et al. | |
| 7,062,502 B1 | 6/2006 | Kesler | |
| 7,428,725 B2 * | 9/2008 | Niyogi et al. | 717/109 |
| 7,509,374 B2 * | 3/2009 | Trinh et al. | 709/203 |
| 7,577,912 B2 | 8/2009 | Govindan et al. | |
| 8,209,355 B2 | 6/2012 | Brid | |
| 8,365,203 B2 * | 1/2013 | Wong et al. | 719/328 |
| 8,949,370 B1 * | 2/2015 | Wu et al. | 709/217 |
| 2003/0070061 A1 | 4/2003 | Wong et al. | |

(Continued)

FOREIGN PATENT DOCUMENTS

| EP | 1571547 A1 | 9/2005 |
|---|---|---|
| WO | 2003/102766 A1 | 12/2003 |

OTHER PUBLICATIONS

Extended European Search Report received for European Patent Application No. 09803375.6, dated Aug. 8, 2011, 6 pages.

(Continued)

*Primary Examiner* — Asher D Kells
(74) *Attorney, Agent, or Firm* — James J. DeCarlo; Greenberg Traurig, LLP (57) ABSTRACT

Techniques are described herein for generating a user interface configured for a mobile device, on-the-fly at run time, in response to receiving a request for a Web page from the mobile device. The user interface for the mobile device may show the Web page with an appearance and content that are similar to the same Web page that is viewed on other devices, such as a non-mobile device. Such similar appearance and content may be possible without an increase in cost because a layout of the Web page that is configured for a non-mobile device is used to generate the user interface. Thus, once the layout for a non-mobile device is launched, its corresponding mobile layout may be automatically ready for launch without incurring additional engineering effort. Accordingly, users can enjoy the same Web experience across a variety of devices.

20 Claims, 6 Drawing Sheets

(56) References Cited

U.S. PATENT DOCUMENTS

| | | | |
|---|---|---|---|
| 2003/0221165 A1* | 11/2003 | Young | G06F 8/38 715/222 |
| 2004/0239683 A1 | 12/2004 | Chu et al. | |
| 2004/0255244 A1* | 12/2004 | Filner et al. | 715/517 |
| 2005/0015745 A1 | 1/2005 | Wain et al. | |
| 2005/0060648 A1* | 3/2005 | Fennelly et al. | 715/523 |
| 2005/0102308 A1 | 5/2005 | Sykes et al. | |
| 2005/0268234 A1 | 12/2005 | Rossi et al. | |
| 2005/0273763 A1 | 12/2005 | Bendsen et al. | |
| 2006/0036634 A1 | 2/2006 | Kristiansen et al. | |
| 2006/0136832 A1 | 6/2006 | Keller et al. | |
| 2006/0161646 A1* | 7/2006 | Chene et al. | 709/223 |
| 2006/0173894 A1 | 8/2006 | Kristoffersen et al. | |
| 2006/0200749 A1 | 9/2006 | Shenfield | |
| 2006/0224992 A1 | 10/2006 | Rossi et al. | |
| 2006/0230379 A1 | 10/2006 | Pintos | |
| 2006/0288301 A1 | 12/2006 | Hood et al. | |
| 2007/0025339 A1* | 2/2007 | Polk | 370/352 |
| 2007/0130205 A1 | 6/2007 | Dengler et al. | |
| 2007/0157087 A1 | 7/2007 | Foerg et al. | |
| 2007/0198339 A1* | 8/2007 | Shen et al. | 705/14 |
| 2007/0206221 A1* | 9/2007 | Wyler et al. | 358/1.15 |
| 2007/0233680 A1 | 10/2007 | Carlson et al. | |
| 2007/0256053 A1 | 11/2007 | Torgerson et al. | |
| 2007/0294646 A1* | 12/2007 | Timmons | 715/864 |
| 2008/0072139 A1* | 3/2008 | Salinas et al. | 715/238 |
| 2008/0139191 A1* | 6/2008 | Melnyk et al. | 455/419 |
| 2008/0201697 A1* | 8/2008 | Matsa et al. | 717/143 |
| 2008/0301545 A1* | 12/2008 | Zhang et al. | 715/235 |
| 2009/0234962 A1* | 9/2009 | Strong et al. | 709/230 |
| 2011/0099294 A1* | 4/2011 | Kapur et al. | 709/246 |
| 2011/0107227 A1* | 5/2011 | Rempell et al. | 715/738 |
| 2012/0117534 A1* | 5/2012 | Hershenson et al. | 717/105 |
| 2012/0137211 A1* | 5/2012 | Lewontin | 715/236 |
| 2012/0137233 A1* | 5/2012 | Lewontin | 715/760 |
| 2012/0185788 A1* | 7/2012 | Fong et al. | 715/765 |
| 2012/0192063 A1* | 7/2012 | Koren et al. | 715/252 |
| 2013/0024757 A1* | 1/2013 | Doll et al. | 715/204 |
| 2013/0097488 A1* | 4/2013 | Coman et al. | 715/243 |
| 2013/0117656 A1* | 5/2013 | Verlaan et al. | 715/234 |
| 2013/0174015 A1* | 7/2013 | Jeff L. | 715/234 |
| 2013/0226992 A1* | 8/2013 | Bapst et al. | 709/203 |
| 2013/0227078 A1* | 8/2013 | Wei et al. | 709/219 |
| 2013/0326333 A1* | 12/2013 | Hashmi | 715/234 |
| 2013/0326337 A1* | 12/2013 | Lehmann et al. | 715/236 |
| 2014/0089786 A1* | 3/2014 | Hashmi | 715/234 |
| 2014/0237065 A1* | 8/2014 | Kloba et al. | 709/213 |
| 2014/0317082 A1* | 10/2014 | Archuleta et al. | 707/710 |

OTHER PUBLICATIONS

Vanderdonckt et al., "Visual Techniques for Traditional and Multimedia Layouts", ACM Proceedings of the Workshop on Advanced Visual Interfaces, 1994, pp. 95-104.

Vermeulen et al., "Service-Interaction Descriptions: Augmenting Services with User Interface Models", Engineering Interactive Systems Joint Working Conferences, Mar. 22-24, 2007, 27 pages.

Wong et al., "GUI Migration Across Heterogeneous Java Profiles", Proc. of the ACM SIGCHI-NZ, 2002, 8 pages.

Ding et al., "Creating Multiplatform User Interfaces by Annotation and Adaptation", Jan 29-Feb. 1, 2006, Proc. of the ACM IUI 2006, pp. 270-272.

International Search Report and Written Opinion received for PCT Patent Application No. PCT/US2009/50890 dated Feb. 17, 2010, 11 pages.

Monteiro, et al., "Gui Generation Based on Language Extensions, A model to generate GUI, based on Source Codewith Custom Attributes", Proceedings of the 10th International Conferenceon Enterprise Information Systems, Barcelona, Jun. 2008, pp. 449-452.

Damyanov, et al."Metadata driven code generation using .NET framework", International Conference Computer Systems and Technologies—CompSysTech'2004, Proceedings of the 5th International Conference on Computer Systems and Technologies, Rousse, Bulgaria, 2004, pp. 1-6, ACM, New York, NY, USA.

Bajaj, "Inferring the User Interface from an EER Data Schema", AMCIS 2006 Proceedings, 2006, 3 pages.

Vigna, "ERW: Entities and Relationships on the Web", 2002, 5 pages.

Meskens, "A Graphical Design Tool for Multi-Device User Interfaces Based on UIML", Master Thesis, Hasselt University, Nov. 2007, 116 pages.

* cited by examiner

DYNAMIC GENERATION OF MOBILE WEB EXPERIENCE

BACKGROUND OF THE INVENTION

Field of the Invention

The present invention relates to techniques for generating Web experience for mobile devices on-the-fly at runtime.

Background

Web sites are widely used today to provide content to users over a computer network, such as the Internet. Experts predict that by 2014, most Internet traffic in the United States will be conducted using mobile devices. Many Web sites however are still designed with only a non-mobile device (e.g., a desktop computer) in mind. When such Web sites are viewed on a mobile device, extensive pinching, zooming, and scrolling may be required for a user to view content on Web pages of the Web sites. Thus, it may be unduly cumbersome for the user to interact with these Web sites via the mobile device.

Techniques have been proposed to generate Web experience for users of mobile devices via mobile-optimized Web sites. However, there are issues with conventional mobile-optimized Web sites. For example, content providers traditionally deploy and maintain two separate Web sites: the mobile optimized Web site, which is designed for a mobile device, and another Web site, which is designed for a desktop device. It is not desirable to implement two such Web sites because of relatively high engineering costs. The burden is especially onerous for a content provider who has multiple websites with frequent changes in content. Moreover, because each Web site has its own implementation, user experience differs between the desktop version and the mobile version.

In addition, mobile devices are becoming increasingly diverse, and a Web site version that looks and performs well on one device type may look and perform poorly on another device type. It would be impractical, and potentially impossible, to create Web site designs for each of the major device types.

BRIEF SUMMARY OF THE INVENTION

Various approaches are described herein for, among other things, generating a user interface configured for a mobile device, on-the-fly at run time, in response to receiving a request for a Web page from the mobile device. The user interface is configured (e.g., optimized) for displaying the Web page on that mobile device. The user interface for the mobile device may show the Web page with an appearance and content that are similar to those of the corresponding Web page that is viewed on other devices, such as a non-mobile device. Such similar appearance and content may be achieved without an increase in cost because a layout of the Web page that is configured for a non-mobile device is used to generate the user interface. Thus, once the layout for a non-mobile device is launched, its corresponding mobile layout may be automatically ready for launch without incurring additional engineering effort. Accordingly, users can enjoy the same Web experience across a variety of devices, regardless whether the devices are mobile devices (e.g., including various types thereof), non-mobile devices (e.g., including various types thereof), or a combination thereof.

An example method is described for generating a user interface for a mobile device. In accordance with this example method, a request for a Web page is received from the mobile device. The request specifies a device type that indicates a type of the mobile device. A layout configured for a non-mobile device is obtained and parsed to determine modules that are included in the layout. Each of the modules includes metadata specifying a respective data type that indicates a type of data that is included in the respective module. A renderer is selected to render respective content that is associated with respective data for each of the modules based on the respective metadata. The user interface is generated for the mobile device, on-the-fly at runtime. The user interface includes the contents rendered by respective renderers in accordance with a format that is based on the device type.

An example system is also described. The example system includes a layout module, renderers, and a generation module. The layout module is configured to obtain a layout of a Web page in response to receipt of a request for the Web page from a mobile device. The request specifies a device type that indicates a type of the mobile device, and the layout is configured for a non-mobile device. The layout module is further configured to parse the layout to determine modules that are included in the layout. Each of the modules includes metadata specifying a respective data type for the respective module. Each of the renderers is configured to render respective content that is associated with respective data for the respective module based on the respective metadata. The generation module is configured to generate a user interface for the mobile device, on-the fly at runtime, that includes the contents rendered by respective renderers in accordance with a format that is based on the device type.

An example computer program product is also described. The computer program product includes a computer-readable storage medium having computer program logic recorded thereon for enabling a processor-based system to provide content to a user. The computer program logic includes first, second, third, fourth and fifth program logic modules. The first program logic module is for enabling the processor-based system to obtain a layout of a Web page in response to receipt of a request for the Web page from a mobile device. The request specifies a device type that indicates a type of the mobile device, and the layout is configured for a non-mobile device. The second program logic module is for enabling the processor-based system to parse the layout to determine modules that are included in the layout. Each of the modules includes metadata specifying a respective data type that indicates a type of data that is included in the respective module. The third program logic module is for enabling the processor-based system to retrieve module data from the layout using a data extraction application programming interface that is configured in accordance with module-specific identifiers that correspond to the respective modules. The fourth program logic module is for enabling the processor-based system to select a renderer to render respective content that is associated with the respective data for each of the modules based on the respective metadata. The fifth program logic module is for enabling the processor-based system to generate a user interface for the mobile device, on-the-fly at runtime, that includes the contents rendered by respective renderers in accordance with a format that is based on the device type.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are capable of dynamically generating Web experience in a user interface (UI) for mobile devices. The UI is configured to display a Web page requested by a user. For example, a user may use a mobile device to request a Web page by providing a uniform resource indicator (URI) (e.g., a uniform resource locator (URL) or a uniform resource name (URN)) that corresponds to the Web page. A layout that is configured for a non-mobile device, such as a desktop computer, is obtained. The layout is then parsed to determine modules that are included in the layout. Each module contains a data type, such as an article, a video, a slide show, a stock ticker, a blog, a comment, or a custom type. The modules from the layout are parsed (e.g., extracted and parsed) to generate data subsets for consumption by renderers. Renderer(s) are selected based on the data type(s) of the modules contained in the layout to render respective content(s). A UI is generated for display on the mobile device of the user, on-the-fly at runtime. The generated UI includes the content(s) rendered by the renderer(s) in accordance with a format that is optimized for the device.

Techniques described herein for generating a UI for mobile devices have a variety of benefits as compared to conventional techniques for providing Web content on mobile devices. For example, techniques described herein enable a content provider to provide Web content on multiple platforms in a cost effective manner. A content provider may launch a Web page having an original layout that is configured for a non-mobile device, such as a desktop computer. The original layout may be created following a service-oriented architecture (SOA), or the original layout may simply be exposed as a service. In other words, the original layout may be created using well-defined Web service APIs. In accordance with embodiments described herein, the same Web service APIs that are used to generate the original layout may be used to generate a UI of a mobile Web page for display on a mobile device. Thus, there is no need to launch or maintain a mobile Web page that is specifically configured for mobile devices in addition to a Web page that is configured for non-mobile devices.

II. Example Embodiments

Figure 1:
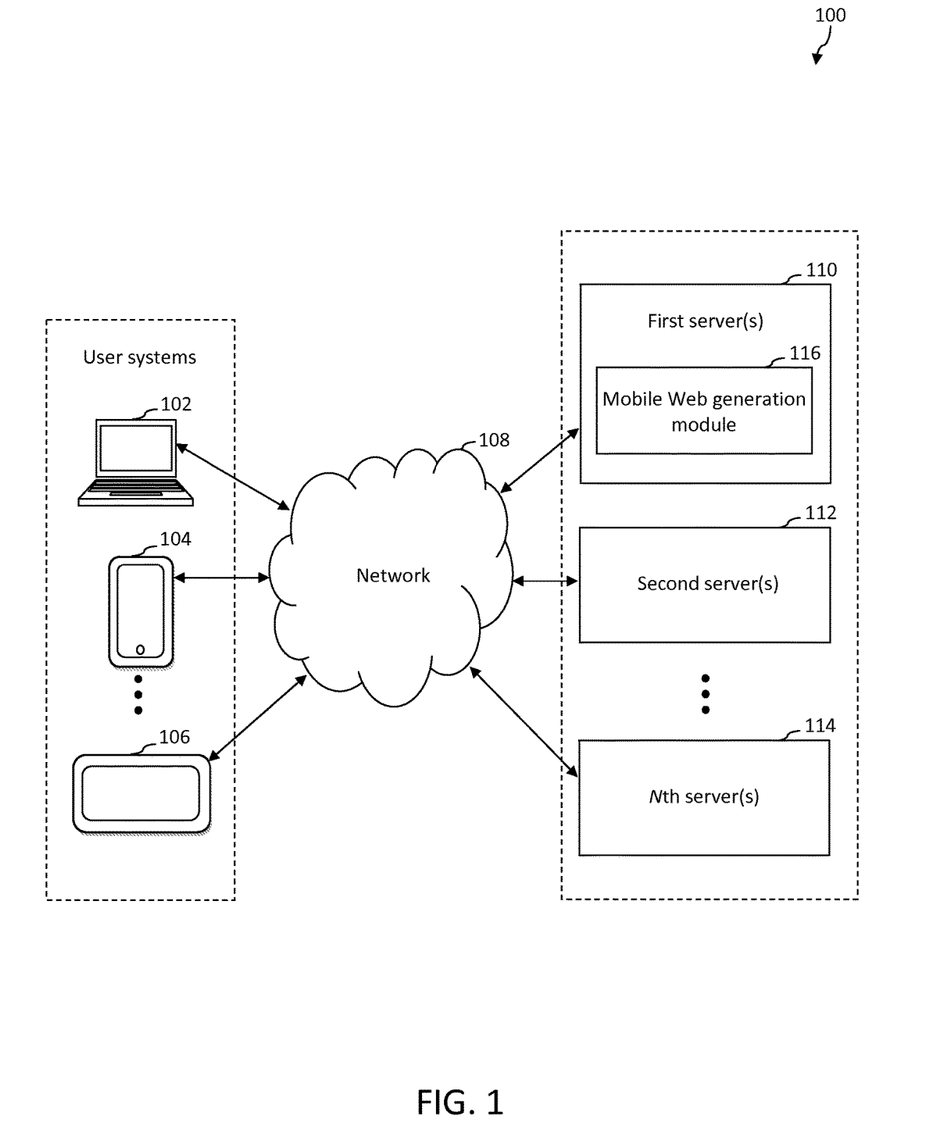
FIG. 1 is a block diagram of an example computer system in accordance with an embodiment described herein.

FIG. 1 is a block diagram of an example computer system 100 in accordance with an embodiment described herein. Generally speaking, computer system 100 operates to generate a UI for a mobile device in response to receiving a request from the mobile device. The UI is generated on-the-fly at runtime in accordance with a format that is configured (e.g., optimized) for viewing on the mobile device. In accordance with example embodiments, computer system 100 is configured to generate the UI based on a layout of a Web page that is originally configured for a non-mobile device.

As shown in FIG. 1, computer system 100 includes a plurality of user systems 102, 104, and 106, a network 108, and a plurality of servers, 110, 112, and 114. Communication among user systems 102, 104, and 106 and servers 110, 112, and 114 is carried out over network 108 using well-known network communication protocols. Network 108 may be a wide-area network (e.g., the Internet), a local area network (LAN), another type of network, or a combination thereof.

User systems 102, 104, and 106 are computing devices or other processing systems, each including one or more processors, that are capable of communicating with servers 110, 112, and 114. User systems 102, 104, and 106 are capable of accessing sites (e.g., Web sites) hosted by servers 110, 112, and 114, so that user systems 102, 104, and 106 may access content that is available via the sites. User systems 102, 104, and 106 are configured to provide requests (e.g., hypertext transfer protocol (HTTP) requests) to servers 110, 112, and 114. For instance, a user may initiate a request for content using a client (e.g., a Web crawler, a Web browser, a non-Web enabled client, etc.) deployed on a user system, such as user system 102, 104, or 106, that is owned by or otherwise accessible to the user.

Each of the user systems 102, 104, and 106 may be a mobile device or a non-mobile device. In accordance with example embodiments described herein, each non-mobile device may access content hosted by one or more of servers 110, 112, and 114 via a UI that is generated on-the-fly and/or at runtime, as described in the discussion below.

Servers 110, 112, and 114 are computers or other processing systems, each including one or more processors that are capable of communicating with user systems 102, 104, and 106. Servers 110, 112, and 114 are configured to host respective sites (e.g., Web sites), so that the sites are accessible to users of computer system 100. Servers 110, 112, and 114 are further configured to provide content to users in response to receiving requests (e.g., HTTP requests) from the users. In accordance with example embodiments described herein, servers 110, 112, and 114 may provide content to a mobile device operated by a user via a UI that is generated on-the-fly and/or at runtime, as described in the discussion below.

First server 110 includes a mobile Web generation module 116. Mobile Web generation module 116 is configured to receive a request for a Web page from a mobile device operated by a user. Such request may specify parameter(s) that relate to the mobile device and/or the requested Web page. Each of the parameter(s) may be retrieved from a uniform resource identifier (URI) (e.g., a uniform resource locator (URL) or a uniform resource name (URN)) that identifies the Web page or from a user agent sent from a client on the mobile device that originated the request. The user agent may specify information including but not limited to a type of client (e.g., browser) that sends the user agent, one or more capabilities of the client, a type of the mobile device, etc.

Mobile Web generation module 116 is further configured to obtain a layout of the Web page that is requested by the user of the mobile device. The layout may be configured for display on a non-mobile device. For example, a non-mobile device may be a desktop computer or a computing device that has a larger display and/or a higher performance capability than a mobile device. In accordance with this example, the layout configured for a non-mobile device may be configured to be rendered or viewed on a device that has a relatively large display.

Mobile Web generation module 116 is further configured to parse the layout to determine the module(s) that are included in the obtained layout. Each of the modules may specify a type of data that is included in the respective module. Examples of a type of data (i.e., a data type) include a video, an article or story, a slideshow, a blog, a comment, a header or a footer, and a custom type that is custom-designed by a Web site designer. The custom type allows the designer to flexibly work with different types of data. The custom type may reflect a theme, relate to an event, etc. For instance, the designer may create a custom type for the Olympics that is called "medal count" to indicate a number of medals that a country receives.

Mobile Web generation module 116 is further configured to select renderer(s) to render data of the modules based on the metadata. There are multiple renderers corresponding to respective data types. For example, an article, which corresponds to an article data type, is rendered by an article renderer. In another example, an image, which corresponds to an image data type, is rendered by an image renderer (a.k.a. a slideshow renderer).

Mobile Web generation module 116 is further configured to generate a UI for the mobile device, on-the-fly at runtime. The UI includes contents rendered by the respective renderers. The format of the UI is based on the device type of the mobile device, such that the UI is configured (e.g., optimized) for viewing on the mobile device.

First server 110 is shown to include mobile Web generation module 116 for illustrative purposes. It will be recognized that any one or more of servers 110, 112, and 114 may include a mobile Web generation module, such as mobile Web generation module 116. It will be further recognized that any one or more user systems 102, 104, and 106 may communicate with any one or more servers 110, 112, and 114. Person skilled in the relevant art(s) will appreciate that user systems 102, 104, and 106 may include any client-enabled system or device, including but not limited to a laptop computer, a tablet computer, a personal digital assistant, a cellular phone, etc. It will be recognized that although some operations are described herein as being performed by a user for ease of discussion, such operations may be performed by a respective user system 102, 104, or 106 or by mobile Web generation module 116 in response to an instruction that is received from the user.

Figure 2:
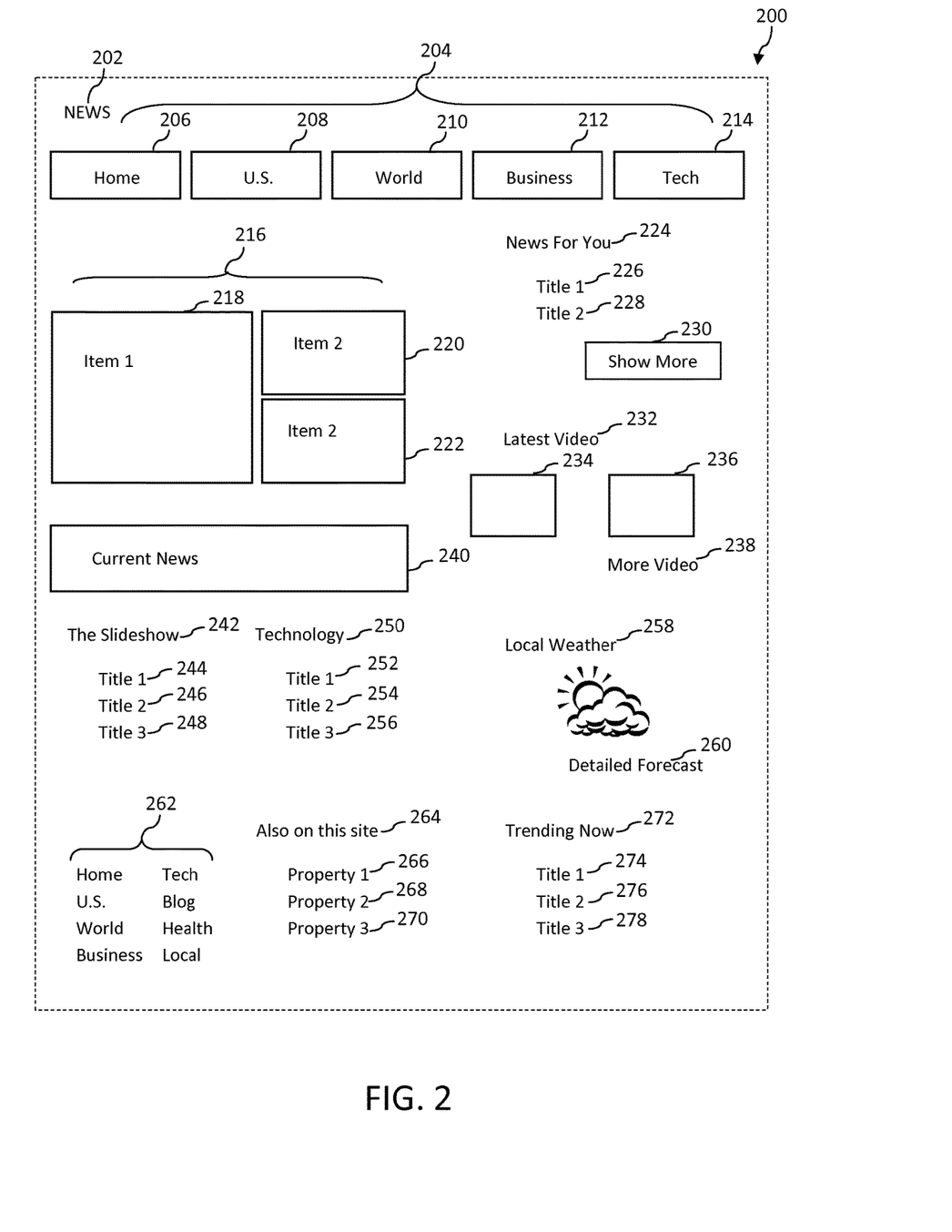
FIG. 2 shows an example layout of a property that is configured for a non-mobile device in accordance with an embodiment described herein.

FIG. 2 shows an example layout 200 of a property (e.g., a Web site) configured for a non-mobile device in accordance with an embodiment described herein. For instance, layout 200 may be provided to a user via a client/browser that is installed on a non-mobile device. As shown in FIG. 2, layout 200 includes a name 202. Name 202 indicates a name of the property. For example, name 202 is labeled as "News" for illustrative purposes. Other exemplary names may be Entertainment, Sports, Finance, Home, and so on. Name 202 reflects a category of content (i.e., a content category) that is presented on layout 200. In this example, the content provided on layout 200 relate to news. Name 202 also serves to orient the user with the property that the user is viewing and may be presented anywhere on layout 200. Optionally, name 202 may be indicated in a title bar of the browser or elsewhere rather than on layout 200.

Layout 200 further includes a header 204. Header 204 is placed at the top of layout 200 for illustrative purposes. Header 204 contains one or more navigational tabs, which are links that enable the user to move around the property. The header is akin to a road map to different areas and information contained in the property. For example, navigational tab 206, which is labeled as Home, directs the user to a homepage. Other navigational tabs may relate to a category, such as "news." Navigational tabs 208, 210, 212, and 214, which are labeled as U.S., World, Business, and Tech, respectively, direct the user to respective sub-categories of the "News" category. For example, if the user selects (e.g., clicks on) navigational tab 210, the user will be directed to a section of the Web site or a separate Web page showing world news content.

Layout 200 further includes modules and other content. A module may be considered a container that holds a particular type of data, such as video, story, article, slideshow, stock ticker, and so on. For instance, a video module contains video data, a slideshow module contains images, and an article module contains article or story data. The modules may be arranged on layout 200 in a number of ways. For example, layout 200 may contain article modules 216, 224, 240, and 250; a video module 232; and a slideshow module 242. Each of these modules may have a visible module title, such as article module 224 having a title of "News For You," or no visible title, such as article module 216.

Each of the modules may contain headlines that relate to subject matter of the corresponding module. The headlines may contain embedded hyperlinks that are directed to more detailed content when selected by the user. For example, article module 216 contains headline 218, headline 220, and headline 222, all of which are depicted as images. In another example, article module 224 contains headline 226 and headline 228, which are shown as text. Article module 224 may also contain a virtual button 230. Virtual button 230 is an interface element that enables the user to alternate between a full view and a compact view of article module 224. For instance, a compact view of article module 224 is shown on layout 200. However, if the user clicks on button 230, then more headlines will be shown under the title of "News for You" of article module 224. The user can click on button 230 again to go back to the compact view. In another example, video module 232 has a title of "Latest Video" and contains video 234 and video 236, which may be depicted as screenshots of respective videos 234 and 236. The user may select the screenshots to play video 234 and video 236 (e.g., on the same Web page, on a separate Web page, or in a different application). Video module 232 may optionally contain a "more" link 238 that is selectable by the user to be shown more videos. In a further example, slideshow module 242 contains headline 244, headline 246, and headline 248, each of which enables the user to view a slide show or a series of images when selected. Article module 250, entitled "Technology," is another example of a module and includes headline 252, headline 254, and headline 256, all of which relate to technology.

In addition to the modules, layout 200 may contain other content, such as advertisements, widgets, link sections, etc. For example, a widget 258 is shown on layout 200 to provide the user with information about the weather. Widget 258 may contain a link 260 to direct the user to a detailed forecast. In another example, section 264 allows the user to navigate to another property (e.g., Autos, Finance, Games, Groups, Health, Maps, Movies, Music, Shopping, Sports, Travel, or TV) upon selection of a property link 266, 268, or 270. Section 272 allows the user to navigate to compiled search results upon selection of a title 274, 276, or 278 (e.g., Salma Hayek, mortgage rates, or diabetes treatment).

Layout 200 may further include a footer 262. Footer 262 is depicted as being at the bottom of layout 200 for illustrative purposes. Footer 262 contains links to different news categories. Footer 262 may be similar to or different from header 204 with respect to the format and categories that are presented.

It will be recognized that layout 200 is provided merely as an example of a news property having a particular configuration for illustrative purposes. It will be further recognized that the content and configuration of layout 200 may vary depending on the featured property (e.g., Finance, Sports, Geolocation, Weather).

Figure 3:
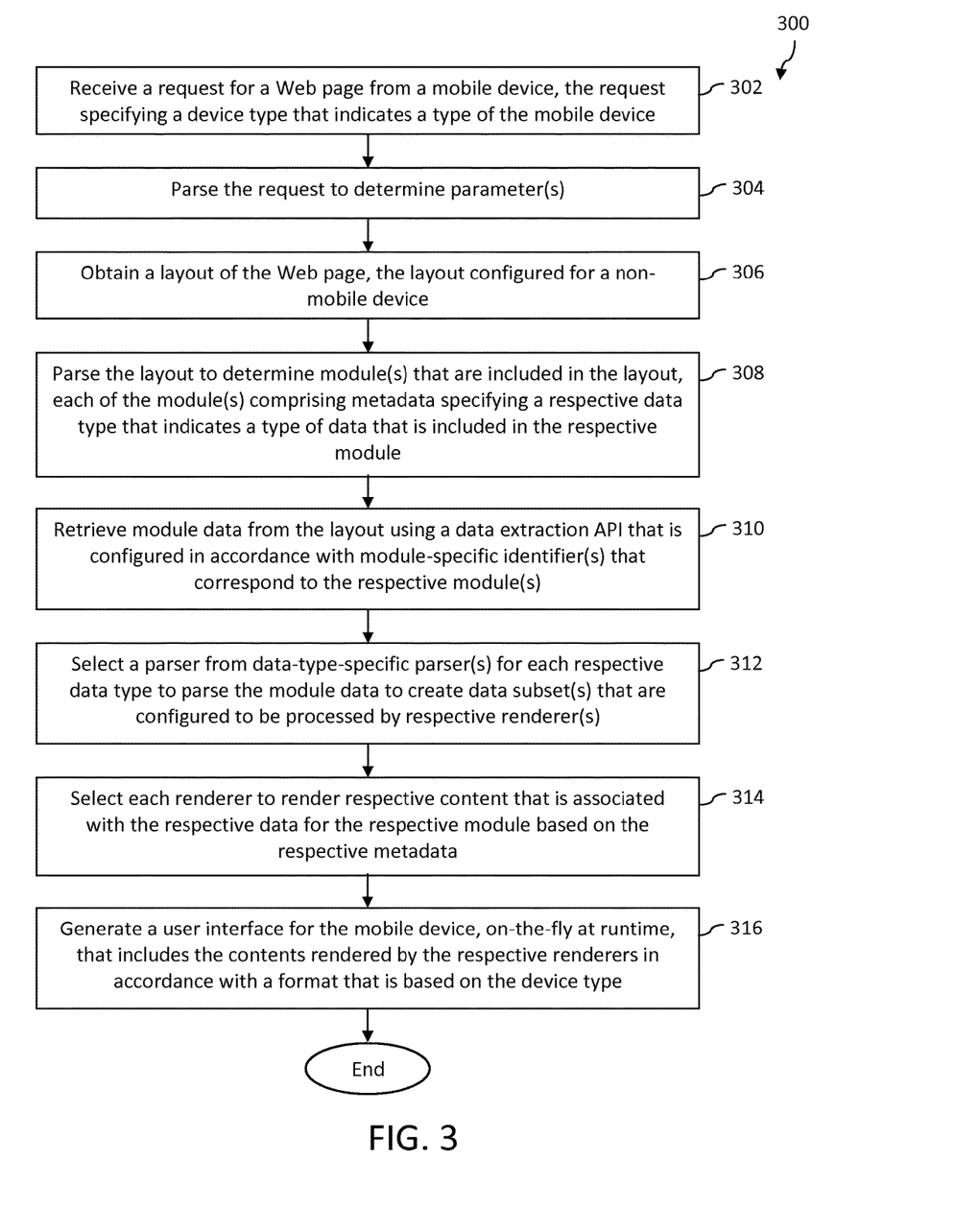
FIG. 3 depicts a flowchart of an example method of generating a user interface for a mobile device on-the-fly in accordance with embodiments described herein.
Figure 4:
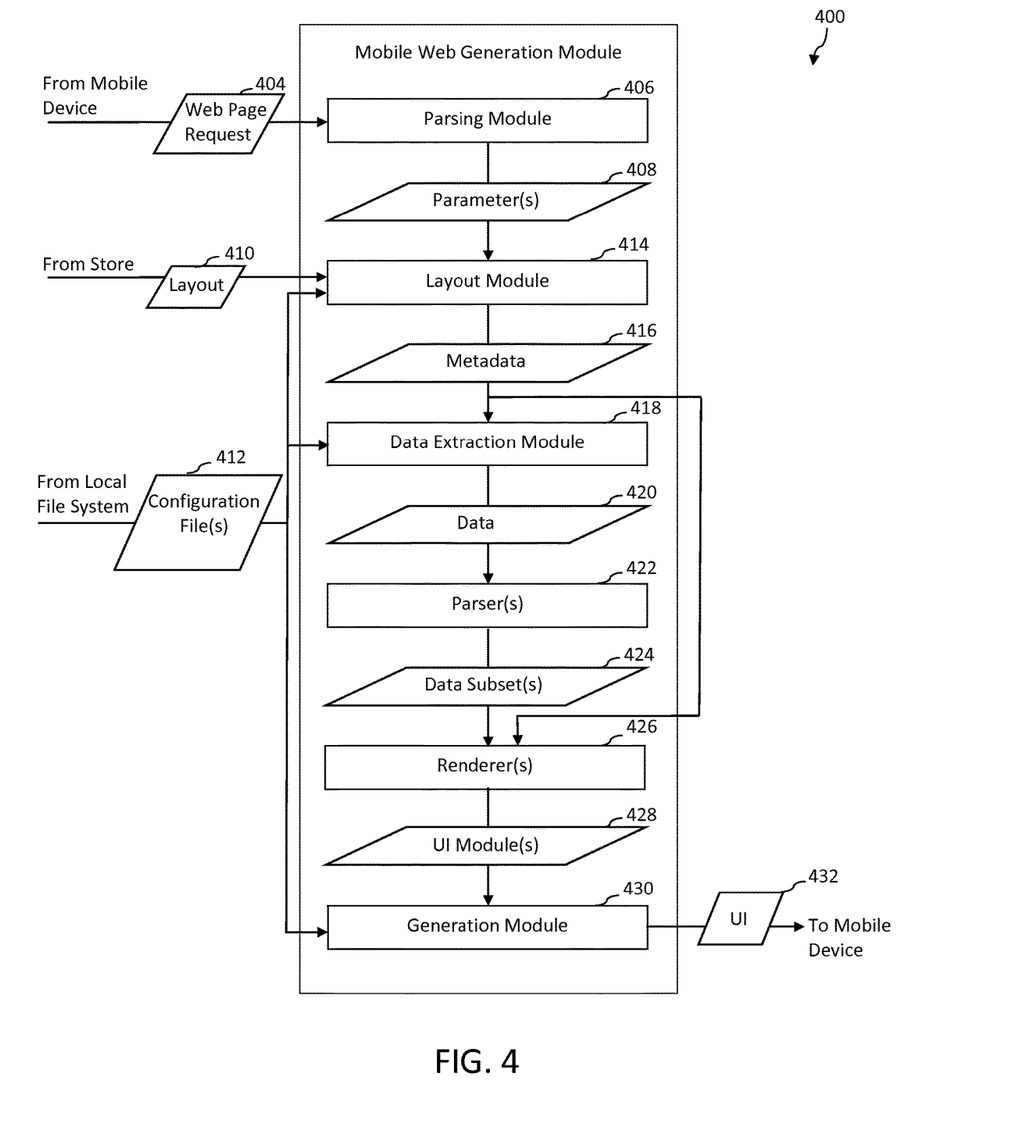
FIG. 4 is a block diagram of an example implementation of a mobile Web generation module shown in FIG. 1 in accordance with embodiments described herein.

FIG. 3 depicts a flowchart of an example method 300 of generating a user interface for a mobile device on-the-fly in accordance with embodiments described herein. Flowchart 300 may be performed by mobile Web generation module 116 of computer system 100 shown in FIG. 1, for example. For illustrative purposes, flowchart 300 is described with respect to a mobile Web generation module 400 shown in FIG. 4, which is an example of a mobile Web generation module 116, according to an embodiment. As shown in FIG. 4, mobile Web generation module 400 includes a parsing module 406, a layout module 414, a data extraction module 418, one or more parsers 422, one or more renderers 426, and a generation module 430. Further structural and operational embodiments will be apparent to persons skilled in the relevant art(s) based on the discussion regarding flowchart 300.

As shown in FIG. 3, the method of flowchart 300 begins at step 302. In step 302, a request for a Web page from a mobile device is received. The request specifies a device type that indicates a type of the mobile device. In an aspect, the request indicates a Web page that the user desires to view. The request may take on any of a variety of forms. For example, the user may request a Web page by selecting a hyperlink from a source, such as an application, a different Web page, or a search result. In another example, the user may request a Web page by providing a direct Web address, such as http://news.yahoo.com. In an example implementation, mobile Web generation module 400 receives a Web page request 404 from a mobile device.

At step 304, the request is parsed to determine parameters. Each of the parameters may include information about the mobile device, information about the browser from which the request was sent, the specific Web page that the user requested, and/or information about the geographical region and/or language associated with the user and/or the request. Such information is used to determine the content in which the user is interested and the manner in which the requested Web page is to be served to the user. In an example implementation, parsing module 406 parses Web page request 404 to determine parameter(s) 408.

In some example embodiments, parameter(s) 408 include a type parameter that specifies the device type associated with the mobile device, a region parameter that specifies a geographical region associated with the request, a language parameter that specifies a language to be associated with content of the requested Web page, and/or a name parameter that specifies a site name associated with the Web page.

The type parameter may be used to configure (e.g., optimize) the requested Web page in accordance with the capabilities of the mobile device. The device type may identify any Internet-capable device, such as a tablet computer or a mobile telephone. For example, if the request is from a high-end device having many capabilities, then the requested Web page may be served to the user in a format (e.g., hypertext markup language 5) that takes advantage of the capabilities of the high-end device.

The region parameter may indicate a location of the user or a location with regard to which the user desires information. The region parameter may be determined by examining information received from the mobile device, such as an address of the mobile device under the Internet Protocol (i.e., an IP address), request parameters sent by the user's browser in a hypertext transfer protocol (HTTP) request, or the Web site requested by the user. For example, if a user in France requests news.yahoo.com, the region parameter will be set to "France" and content specific to France will be served to the user. However, when the user specifically requests a regional uniform resource indicator or location that indicates a designated geographical region, then the geographical information from this specific request may take precedence over other information received. Thus, in an embodiment, the request may be parsed to determine whether the request includes a uniform resource indicator (URI) that indicates a designated geographical region, and in response to determining that the request includes the URI, set the region parameter to specify the designated geographical region. For example, if a user from the United States directly requests in.news.yahoo.com, then the region parameter will be set to India and content specific to India would be served to the user even though the IP address of the user indicates that the user is in the United States and would otherwise be served with content specific to the United States.

The language parameter indicates a language in which content of the requested Web page is to be served. For example, if the user requests fr.news.yahoo.com, then the language parameter will be set to French and the requested Web page will be served to the user in French.

The name parameter indicates a name of the requested property. The name may be descriptive of content featured on the Web page. For example, layout 200 shown in FIG. 2 has the name "News."

At step 306, a layout of the Web page is obtained. The layout is configured for a non-mobile device. In order to provide the user with the same Web experience regardless of the viewing device, it is useful to synchronize the UI for the mobile device to the layout, which is configured for the non-mobile device. To that end, one or more configuration file(s) 412 for the layout may be consulted in connection with step 306. Configuration file(s) 412 may include a master (e.g., generic) configuration file and/or a site-specific configuration file. In general, mobile Web generation module 400 may generate a UI based on the master configuration file, which may be overridden with a site-specific configuration file. Thus, if a site-specific configuration exists, then it may take precedence over the master configuration file. In an embodiment, prior to obtaining the layout of the Web page, the master configuration file may be referred to for determining the application programming interfaces (API) needed to retrieve the layout. In another embodiment, the site-specific configuration may be referred to in addition to or in lieu of the master configuration file. For example, if a user from the United States requests news.yahoo.com, a master news configuration file for the requested Web page and any other applicable site-specific configuration files (e.g., a United States specific configuration file) may be used to obtain the layout. In an embodiment, the configuration files may be stored in a local file system or in the same location as mobile Web generation module 400.

The obtained layout may be configured for a non-mobile device, such as a desktop computer, which may have a more powerful processor and/or a larger display for viewing the layout than a mobile device. The layout may be obtained from a local storage or a remote storage. In an example implementation, layout module 414 obtains layout 410 of the requested Web page from a store, which may be remote (e.g., at a cloud server) or local, using a layout API. Layout 410 may be layout 200 shown in FIG. 2 or any other suitable layout.

The layout API may be a Web service or Web API that is generally defined as a set of HTTP request messages along with a definition of response messages, typically expressed in JavaScript Object Notation (JSON) or Extensible Markup Language (XML), designed to facilitate communication between two electronic devices over a network. In an embodiment, the layout configured for a non-mobile device may be generated using the layout API to retrieve layout information, which provides a wire frame and the modules of the Web page that are associated with the layout. Layout information may be programmed by editors and may be different for each property. For example, a layout for a Finance site may be different from a layout for a News site. Once the layout is obtained by the layout API, a data extraction API may be used to gather data associated with the modules, which are eventually used to construct the UI for the mobile device. This layout may be implemented following a service-oriented architecture (SOA). Instead of following the SOA, the layout may also simply expose its layout information and data information as a service that is machine-readable and may be queried by a Web service API. In this manner, it is possible to use these same APIs or services used to generate the layout configured for the non-mobile device to generate a UI for a mobile device with relatively little effort.

In an example embodiment, a layout API is configured with parameters 408 (e.g., alias, region, language, device) and has the following format:

```
http://yahoo-api-
domain:xxx/layout/v1/alias={alias__id};view=layout?
region={region}&lang={lang}&device={pc}&site={name}
status={live}&format={json}
``` where alias indicates a type of page (e.g., a landing/main page having multiple modules, a slideshow page having slideshows, or a story page having articles); region indicates a geographical region associated with the request (e.g., a region for which information is desired); lang indicates a language associated with content of the requested page (e.g., a language in which information is desired); device indicates a device type for which a layout is retrieved; site indicates a name of a property; status indicates a status of the Web page; and format indicates a data format desired at the requesting mobile device.

At step 308, the layout is parsed to determine module(s) that are included in the layout. Each of the module(s) includes metadata specifying a respective data type that indicates a type of data that is included in the respective module. For example, as shown in layout 200, modules may include videos, slideshows, stories, and so on. For example, a slideshow module may include five slideshows; a story module may include twelve stories, and so on. Moreover, each module may contain metadata 416 that provide descriptive information about the module and/or module data. Metadata 416 may include a headline, a name (e.g., "Latest News"), a configuration of the module (e.g., a flag to indicate whether there is a "more" link associated with the module), information about a provider, or one or more module-specific identifiers.

Configuration file(s) 412 may be again consulted in step 308 in order to maintain synchronicity between the layout configured for the non-mobile device and the UI for the mobile device. For example, configuration file(s) 412 may be referred to for determining whether there are modules that need to be ordered or blacklisted. Blacklisted modules are removed from a result set containing the modules in the layout, and the remaining modules from the result set are ordered in a specified order or in a default manner (e.g., alphabetic). In an example implementation, layout module 414 is configured to parse the layout to determine module(s) that are included in the layout, such as layout 200 shown in FIG. 2, to identify the different modules (e.g., story, video, slideshow) to be included in the UI.

At step 310, module data are retrieved from the layout using a data extraction API that is configured in accordance with the module-specific identifier(s) that correspond to the respective module(s). For example, data 420 may include module data, which are content that are associated with each module, such as video, article, images, and so on, as well as navigational data. The module data may be associated with metadata 416, which are information that describe the module data. Metadata 416 may include module-specific identifiers that uniquely identify the data type contained in the corresponding module and enable the desired module data to be identified and queried. Thus, data for the module may be fetched by using the module-specific identifiers. For instance, a slideshow module having an arbitrary number of slideshows will have an identifier that is specific to the slideshow module. In an example embodiment, identifier(s) of respective module(s) may be collected and queried in a batch such that at a given point in time, all data needed to produce the UI are available. Accordingly, a plurality of requests may be provided contemporaneously to retrieve the module data from the layout. The identifiers may be used in connection with a data extraction API to retrieve the module data. The data extraction API is a Web service.

In an example embodiment, a data extraction API is configured with metadata 416 and/or other parameters and has the following format:

```
http://yahoo-api-domain:xxxx/data/v1/data_id={data_id};view={view_type};
output={required_output};count={count};start={start}?region={region}&
lang={lang}&device={pc}&status=live&site={site_name}&format={json}
``` where data_id, which may be referred to as list id, is a module-specific identifier; view_type indicates the type of information required (e.g., summary, detailed, etc.); count represents the number of items required; and start identifies a starting point of a given record set. For example, if there is a total of 100 news items, and only ten items starting from position 5 are desired to be shown, then start=5 and count=10 in the data extraction API. This is useful when pagination is required for a module. For instance, suppose there are 25 news items to be shown in the "Top Stories" module. However, it is not possible to show all 25 news item in one page on a mobile device. Thus, the 25 news items are distributed in pages, for example, 5 news items per page. When the user is viewing the first page, data is pulled using the data extraction API with start=1 and count=5, when the user is viewing the second page, data is pulled with start=6 and count=5, and so on. Other parameters are the same as previously described in reference to the layout API.

In addition to module data, navigation data may also be extracted using a navigation API with the following format:

```
http://yahoo-api-domain:xxxx/navigation/v1/?region={region}&lang=
{lang}&site={site_name}&device={pc}&status=live&site={site_name}&
format={json}
```

Figure 5:
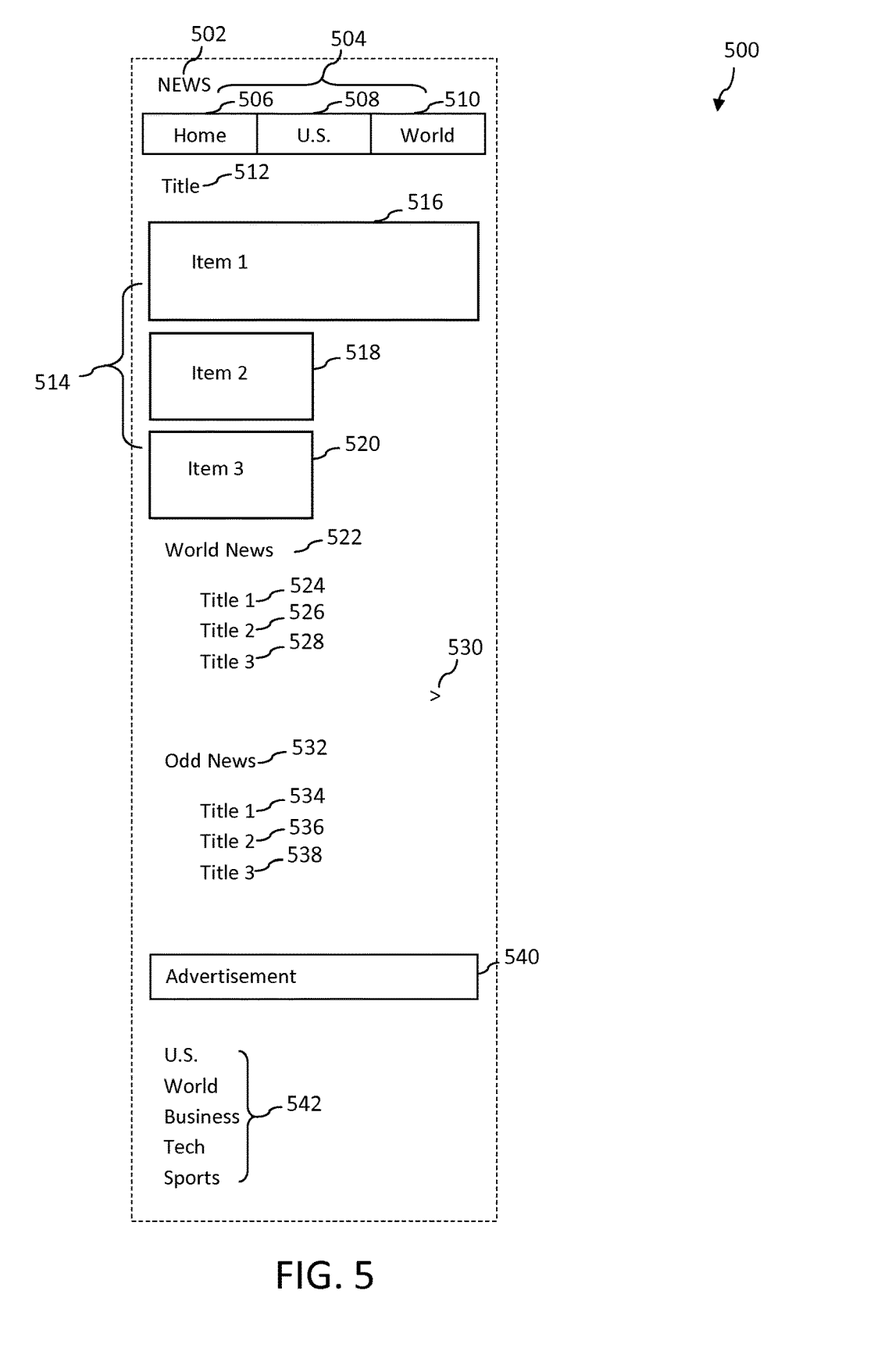
FIG. 5 shows an example user interface generated for a mobile device in accordance with embodiments described herein.

The parameters of the navigation API are the same as previously described in reference to the layout API. In an embodiment, navigation data for a header (e.g., header 204 or header 504) and/or a footer (e.g., footer 262 or footer 542) is retrieved using the navigation API. Navigation data indicates how a user may move around and explore a Web site.

Configuration file(s) 412 may be used in connection with step 310 for determining whether there is 1) a limit to the number of modules that may be shown in the UI, 2) a provider filter to exclude content from one or more providers in general or under designated condition(s) (e.g., content from Reuters news agency may not be shown for a particular region), or 3) an ordering of navigational tabs (e.g., any one or more of tabs 206, 208, 210, 212, and 214). In an example implementation, data extraction module 418 extracts data 420, including module data and navigation data, from the layout obtained in step 414 based on metadata 416.

At step 312, a parser is selected from a plurality of data-type-specific parsers for each respective data type to parse the module data to create data subset(s) that are configured to be processed by the respective render(s) to render respective contents. Each of the data-type-specific parsers corresponds to a respective type of data. Examples of data-type-specific parsers include but are not limited to a story parser, a slideshow parser, a photo parser, a video parser, an article parser, a navigation data parser, etc. In an example embodiment, module data and navigation data are parsed using the data-type-specific parsers to create data subsets (a.k.a. data bean objects), which can be consumed by renderers in step 314. For example, a slideshow parser parses slideshow(s), a photo parser parses image(s) (e.g., photograph(s)), and a navigation parser parses navigation data. In an example implementation, parsers 422 parse data 420 to generate data subsets 424.

In step 314, a renderer is selected to render respective content that is associated with the respective data for each of the modules based on the respective metadata. Each renderer corresponds to a respective module or data type. Examples of a renderer include, but are not limited to, an article/story renderer, a blog renderer, a comment renderer, a footer renderer, a header renderer, a slideshow renderer, a stock data ticker renderer, etc. For example, if the module data is of type video, then the video data is passed to the video renderer; if the module data is of type story, then the story data is passed to the story renderer, and so on. It is possible to customize a renderer based on need or a special theme or event. For example, if a new data type such as a medal count data type is desired, a renderer may be created to accommodate that new data type. In an example implementation, renderers 426 receive data subsets 424 from parsers 422 and generate UI modules 428 based on metadata 416.

At step 316, the UI for the mobile device is generated on-the-fly at runtime. The UI includes the contents rendered by the respective renderers in accordance with a format that is based on the device type. UI modules may be stitched together along with a header and a footer to generate the UI for the mobile device from which a request for a Web page originated. A request for a Web page, such as request 404 shown in FIG. 4, may include a user agent that specifies information about the type of browser and/or mobile device that the user is using. Such information may be utilized to configure (e.g., optimize) the UI. For example, if the user uses a low grade mobile device, the UI that is generated may be minimalistic in nature without any scroll bars or videos.

In an embodiment, the UI is generated based on a generic and/or site-specific configuration file that specifies a configuration of the UI with respect to a theme color, an appearance of a plurality of modules, an arrangement of advertisements, and/or a site name for display. Configuration file(s) 412 may be consulted in step 316 in order to continue to maintain synchronicity between the layout configured for the non-mobile device and the UI for the mobile device. For example, if no site-specific configuration file with respect to a theme color is specified, a generic configuration file reporting a default color may be used. In general, configuration file(s) 412 may specify whether there is a need to not show a "more" link for a module. By default, the determination of whether or not to show the "more" link is based on module metadata that is received with layout data. In an example implementation, generation module 430 generates UI 432 on-the-fly at runtime.

In another embodiment, the UI is generated in accordance with a decoration pattern that enables a determination to be made at runtime regarding an order in which to call the selected renders. For dynamic implementation of rendering modules, the decorator pattern may be used such that any sequence of data may be attached to the UI. The decorator pattern is a well-known design pattern that allows a functionality of an object to be extended dynamically at runtime as the object is used. In an example embodiment, the decorator pattern allows a determination to be made at runtime regarding an order in which to call the selected renderers. For example, a layout, such as layout 200 shown in FIG. 2, may contain various modules in any suitable sequence. When applied, the decorator pattern enables the various modules to be dynamically positioned with respect to the UI. If the decorator pattern is not utilized, the position of the modules may be determined via hard coding, which statically determines where each module is to appear on the UI. For example, a designer may write software code to dictate that the story module will appear on the top of the UI and the slideshow module will appear on the bottom of the UI. Thus, the decorator pattern is advantageous in that it provides the flexibility for each property to have its own layout requirements.

In some example embodiments, the stitched UI modules and the applicable header and footer are passed to an optimization component (e.g., an abstraction layer), which further optimizes the UI based on device type. For example, the stitched UI modules may be generated in Extensible Markup Language (XML) format. The optimization component may convert the XML format to Hypertext Markup Language (HTML) format based on the specific capabilities of the mobile device. The resulting UI in HTML format may be optimized for the mobile device.

It will be recognized that the UI may be displayed on a display of the mobile device in response to step 316. One example of a UI that may be provided for display on a mobile device is layout 500 of FIG. 5, which is discussed in greater detail below.

FIG. 5 shows an example user interface (UI) 500 generated for a mobile device in accordance with embodiments described herein. User interface 500 includes a layout of the same property shown in layout 200 of FIG. 2. The difference between the layout in UI 500 and layout 200 is that the layout in UI 500 is configured for a mobile device. It will be recognized that UI 500, and the layout therein, is generated on the fly at run time based on layout 200. Accordingly, the layout in UI 500 is similar to layout 200 with respect to the appearance and modules that it contains. In an example implementation, UI 500 may be UI 432, which is generated by generation module 430 in FIG. 4.

UI 500 may be provided to a user via a browser that is installed on a mobile device, which may be user system 104 shown in FIG. 1, for instance. As shown in FIG. 5, UI 500 includes a name 502. UI 500 also includes a header 504, which contains exemplary navigational tabs 506, 508, and 510. Header 504 may contain fewer navigational tabs than header 204 of FIG. 2 because screen space is generally limited on a mobile device, though the example embodiments are not limited in this respect. UI 500 further includes modules and other content. The modules may be arranged in UI 500 in a manner depicted in FIG. 5 or any other suitable manner. UI 500 may contain article module 514 having title 512. Article module 514 may include articles 516, 518, 520, which may be shown as images relating to the respective articles. Each of articles 516, 518, and 520 may be shown on a different page if selected by the user. UI 500 may further contain other article modules 522 and 532, entitled World News and Odd News, respectively. Article module 522 contains headlines 524, 526, 528 and article module 532 contains headlines 534, 536, and 538. If a module contains more items than shown on the main or landing page, the excess items may be accessible to the user (e.g., on a different page) via a "more" link. For example, as shown in FIG. 5, article module 522 contains a link 530 that, once selected, will show the user more headlines relating to world news. UI 500 may optionally contain one or more advertisements 540, the position of which may be dictated by configuration file(s) 412 and need not necessarily be at the bottom of UI 500 as shown in FIG. 5. UI 500 may also contain a footer 542. Footer 542 may contain links to different news categories.

III. Other Example Embodiments

It should be noted that mobile Web generation module 116 of FIG. 1 may include parsing module 406, layout module 414, data extraction module 418, parser(s) 422, render(s) 426, and generation module 430 of FIG. 4 or any portion or combination thereof, for example, though the scope of the embodiments is not limited in this respect.

Mobile Web generation module 116, parsing module 406, layout module 414, data extraction module 418, parser(s) 422, render(s) 426, and generation module 430 may be implemented in hardware, or any combination of hardware with software and/or firmware. For example, mobile Web generation module 116, parsing module 406, layout module 414, data extraction module 418, parser(s) 422, render(s) 426, and/or generation module 430 may be implemented as computer program code configured to be executed in one or more processors. In another example, mobile Web generation module 116, parsing module 406, layout module 414, data extraction module 418, parser(s) 422, render(s) 426, and/or generation module 430 may be implemented as hardware logic/electrical circuitry.

IV. Example Computer Implementation

Figure 6:
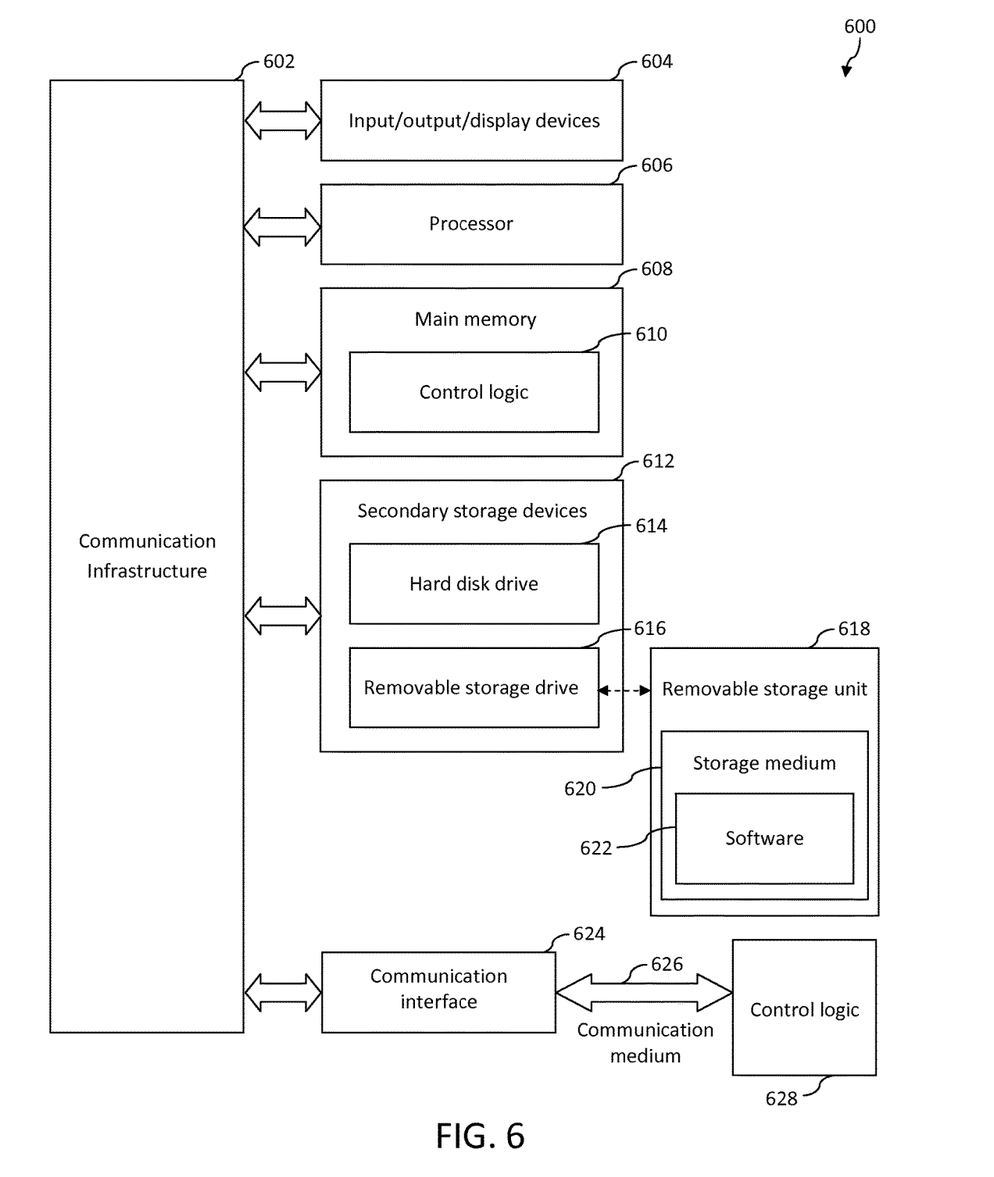
FIG. 6 is a block diagram of a computer in which embodiments may be implemented.

The embodiments described herein, including systems, methods/processes, and/or apparatuses, may be implemented using well-known servers/computers, such as computer 600 shown in FIG. 6. For example, elements of example computer system 100, including any of the user systems 102, 104, and 106 and any of the servers 110, 112, and 114 depicted in FIG. 1 and elements thereof (including mobile Web generation module 116 depicted in FIG. 1, mobile Web generation module 400 depicted in FIG. 4, and elements thereof), and each of the steps of flowchart 300 depicted in FIG. 3 can each be implemented using one or more computers 600.

Computer 600 can be any commercially available and well-known computer capable of performing the functions described herein, such as computers available from International Business Machines, Apple, Sun, HP, Dell, Cray, etc. Computer 600 may be any type of computer, including a desktop computer, a server, etc.

As shown in FIG. 6, computer 600 includes one or more processors (e.g., central processing units (CPUs)), such as processor 606. Processor 606 may include mobile Web generation module 116 of FIG. 1; parsing module 406, layout module 414, data extraction module 418, parser(s) 422, render(s) 426, and/or generation module 430 of FIG. 4; or any portion or combination thereof, for example, though the scope of the embodiments is not limited in this respect. Processor 606 is connected to a communication infrastructure 602, such as a communication bus. In some embodiments, processor 606 can simultaneously operate multiple computing threads.

Computer 600 also includes a primary or main memory 608, such as a random access memory (RAM). Main memory has stored therein control logic 610 (computer software), and data.

Computer 600 also includes one or more secondary storage devices 612. Secondary storage devices 612 include, for example, a hard disk drive 614 and/or a removable storage device or drive 616, as well as other types of storage devices, such as memory cards and memory sticks. For instance, computer 600 may include an industry standard interface, such as a universal serial bus (USB) interface for interfacing with devices such as a memory stick. Removable storage drive 616 represents a floppy disk drive, a magnetic tape drive, a compact disk drive, an optical storage device, tape backup, etc.

Removable storage drive 616 interacts with a removable storage unit 618. Removable storage unit 618 includes a computer useable or readable storage medium 620 having stored therein computer software 622 (control logic) and/or data. Removable storage unit 618 represents a floppy disk, magnetic tape, compact disc (CD), digital versatile disc (DVD), Blue-ray disc, optical storage disk, memory stick, memory card, or any other computer data storage device. Removable storage drive 616 reads from and/or writes to removable storage unit 618 in a well-known manner.

Computer 600 also includes input/output/display devices 604, such as monitors, keyboards, pointing devices, etc.

Computer 600 further includes a communication or network interface 624. Communication interface 624 enables computer 600 to communicate with remote devices. For example, communication interface 624 allows computer 600 to communicate over communication networks or mediums 626 (representing a form of a computer useable or readable medium), such as local area networks (LANs), wide area networks (WANs), the Internet, etc. Communication interface 624 may interface with remote sites or networks via wired or wireless connections. Examples of communication interface 624 include but are not limited to a modem, a network interface card (e.g., an Ethernet card), a communication port, a Personal Computer Memory Card International Association (PCMCIA) card, etc.

Control logic 628 may be transmitted to and from computer 600 via the communication medium 626.

Any apparatus or manufacture comprising a computer useable or readable medium having control logic (software) stored therein is referred to herein as a computer program product or program storage device. This includes, but is not limited to, computer 600, main memory 608, secondary storage devices 612, and removable storage unit 618. Such computer program products, having control logic stored therein that, when executed by one or more data processing devices, cause such data processing devices to operate as described herein, represent embodiments of the invention.

For example, each of the elements of example servers 110, 112, and 114, including mobile Web generation module 116, each depicted in FIG. 1; parsing module 406, layout module 414, data extraction module 418, parser(s) 422, render(s) 426, and/or generation module 430, each depicted in FIG. 4; and/or each of the steps of flowchart 300 depicted in FIG. 3 can be implemented as control logic that may be stored on a computer useable medium or computer readable medium, which can be executed by one or more processors to operate as described herein.

Computer readable storage media are distinguished from and non-overlapping with communication media. Communication media typically embodies computer-readable instructions, data structures, program modules, or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
   receiving, at a computing device, a request for a Web page from a mobile device, the request specifying a device type that indicates a type of the mobile device;
   obtaining, via the computing device, a layout of the Web page, the layout configured for a non-mobile device;
   parsing, via the computing device, the layout to determine a plurality of modules that are included in the layout, said parsing comprising identifying, for each determined module, metadata, said metadata, for each determined module, specifying a respective data type that indicates a type of data that is included in the respective module, said metadata, for each determined module, further specifying a configuration of the respective module corresponding to the module's functionality;
   selecting, via the computing device, a renderer from a plurality of renderers to render respective content, said selected renderer is associated with the respective data for each of the plurality of modules and corresponds to the respective metadata; and
   generating, via the computing device, a user interface for the mobile device, on-the-fly at runtime, that includes the contents rendered by respective renderers in accordance with a format that is based on the device type.

2. The method of claim 1, further comprising:
   parsing the request to determine a plurality of parameters that include a type parameter that specifies the device type, a region parameter that specifies a geographical region associated with the request, a language parameter that specifies a language to be associated with the contents, and a name parameter that specifies a name associated with the Web page;

wherein obtaining the layout of the Web page comprises: obtaining the layout of the Web page from a cloud server using a layout application programming interface (API) that is configured in accordance with the plurality of parameters.

3. The method of claim 2, wherein parsing the request comprises:
determining whether the request includes a uniform resource indicator that indicates a designated geographical region; and
setting the region parameter to specify the designated geographical region in response to determining that the request includes the uniform resource indicator.

4. The method of claim 2, further comprising:
retrieving module data from the layout using a data extraction API that is configured in accordance with a plurality of module-specific identifiers that correspond to the plurality of respective modules; and
retrieving navigation data for at least one of a header or a footer using a navigation API.

5. The method of claim 4, wherein retrieving the module data comprises: providing a plurality of requests contemporaneously to retrieve the module data from the layout.

6. The method of claim 4, further comprising:
selecting a parser from a plurality of data-type-specific parsers for each respective data type; and
parsing the module data using the data-type-specific parsers that correspond to the respective data types to create respective data subsets that are configured to be processed by the respective renderers to render the respective contents.

7. The method of claim 1, wherein selecting the renderer from the plurality of renderers for each of the plurality of modules comprises: selecting the renderer from the plurality of renderers, which includes at least one of a video renderer, an article renderer, a slideshow renderer, a blog renderer, a comment renderer, a header renderer, or a footer renderer, for each of the plurality of modules.

8. The method of claim 1, wherein generating the user interface for the mobile device comprises: generating the user interface based on a generic configuration file that specifies a configuration of the user interface with respect to one or more of a theme color, an appearance of the plurality of modules, an arrangement of advertisements, or a site name for display.

9. The method of claim 1, wherein generating the user interface for the mobile device comprises: generating the user interface based on a site-specific configuration file that specifies a customization of the user interface with respect to one or more of a theme color, an appearance of the plurality of modules, an arrangement of advertisements, or a site name for display.

10. The method of claim 1, wherein generating the user interface comprises: generating the user interface in accordance with a decorator pattern that enables a determination to be made at runtime regarding an order in which to call the selected renderers; and
wherein the method further comprises: displaying the user interface on a display of the mobile device.

11. A system comprising:
a processor; and
a non-transitory storage medium for tangibly storing thereon program logic for execution by the processor, the program logic comprising:

obtaining logic executed by the processor for obtaining a layout of a Web page in response to receipt of a request for the Web page from a mobile device, the request specifying a device type that indicates a type of the mobile device, the layout configured for a non-mobile device;
parsing logic executed by the processor for parsing the layout to determine a plurality of modules that are included in the layout, said parsing comprising identifying, for each determined module, metadata, said metadata, for each determined module, specifying a respective data type that indicates a type of data that is included in the respective module, said metadata, for each determined module, further specifying a configuration of the respective module corresponding to the module's functionality;
rendering logic executed by the processor for selecting a renderer from a plurality of renderers to render respective content, said selected renderer is associated with the respective data for each of the plurality of modules and corresponds to the respective metadata; and
generation logic executed by the processor for generating a user interface for the mobile device, on-the-fly at runtime, that includes the contents rendered by the respective renderers in accordance with a format that is based on the device type.

12. The system of claim 11, further comprising:
parsing logic executed by the processor for parsing the request to determine a plurality of parameters that include a type parameter that specifies the device type, a region parameter that specifies a geographical region associated with the request, a language parameter that specifies a language to be associated with the contents, and a name parameter that specifies a name associated with the Web page; and
obtaining logic executed by the processor for obtaining the layout of the Web page from a cloud server using a layout application programming interface (API) configured in accordance with the plurality of parameters.

13. The system of claim 12, further comprising:
determination logic executed by the processor for determining whether the request includes a uniform resource indicator that indicates a designated geographical region; and
setting logic executed by the processor for setting the region parameter to specify the designated geographical region in response to a determination that the request includes the uniform resource indicator.

14. The system of claim 12, further comprising:
retrieval logic executed by the processor for retrieving module data from the layout using a data extraction API that is configured in accordance with a plurality of module-specific identifiers that correspond to the plurality respective of modules, and for retrieving navigation data for at least one of a header or a footer using a navigation API.

15. The system of claim 14, further comprising:
request logic executed by the processor for providing a plurality of requests contemporaneously to retrieve the module data from the layout.

16. The system of claim 14, further comprising:
parsing logic executed by the processor for parsing the module data to create respective data subsets that are configured to be processed by the respective renderers to render the respective contents.

17. The system of claim 11, wherein the plurality of renderers comprises at least one of a video renderer, an article renderer, a slideshow renderer, a blog renderer, a comment renderer, a header renderer, or a footer renderer.

18. The system of claim 11, further comprising:
generation logic executed by the processor for generating the user interface based on a configuration file that specifies a configuration of the user interface with respect to one or more of a theme color, an appearance of the plurality of modules, an arrangement of advertisements, or a site name for display.

19. The system of claim 11, further comprising:
generation logic executed by the processor for generating the user interface based on a site-specific configuration file that specifies a customization of the user interface with respect to one or more of a theme color, an appearance of the plurality of modules, an arrangement of advertisements, or a site name for display.

20. A non-transitory computer-readable storage medium tangibly encoded with computer-executable instructions, that when executed by a processor associated with a computer, performs a method comprising:

obtaining a layout of a Web page in response to receipt of a request for the Web page from a mobile device, the request specifying a device type that indicates a type of the mobile device, the layout configured for a non-mobile device;

parsing the layout to determine a plurality of modules that are included in the layout, said parsing comprising identifying, for each determined module, metadata, said metadata, for each determined module, specifying a respective data type that indicates a type of data that is included in the respective module, said metadata, for each determined module, further specifying a configuration of the respective module corresponding to the module's functionality;

retrieving module data from the layout using a data extraction application programming interface (API) that is configured in accordance with a plurality of module-specific identifiers that corresponds to the plurality of respective modules;

selecting a renderer from a plurality of renderers to render respective content, said selected renderer is associated with the respective data for each of the plurality of modules and corresponds to the respective metadata; and generating a user interface for the mobile device, on-the-fly at runtime, that includes the contents rendered by respective renderers in accordance with a format that is based on the device type.

* * * * *